(12) United States Patent
Ogawa (10) Patent No.: US 12,208,786 B2
(45) Date of Patent: Jan. 28, 2025

(54) TRAVEL SUPPORT CONTROL DEVICE FOR HYBRID ELECTRIC VEHICLE

(71) Applicant: TOYOTA JIDOSHA KABUSHIKI KAISHA, Toyota (JP)

(72) Inventor: Yuki Ogawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 217 days.

(21) Appl. No.: 17/860,452

(22) Filed: Jul. 8, 2022

(65) Prior Publication Data

US 2023/0035900 A1 Feb. 2, 2023

(30) Foreign Application Priority Data

Jul. 29, 2021 (JP) .................................. 2021-124299

(51) Int. Cl.
 *B60W 20/12* (2016.01)
 *B60L 58/13* (2019.01)
 (Continued)

(52) U.S. Cl.
 CPC ............. *B60W 20/12* (2016.01); *B60L 58/13* (2019.02); *B60W 20/13* (2016.01);
 (Continued)

(58) Field of Classification Search
 CPC .... B60W 20/12; B60W 20/13; B60W 30/182; B60W 40/105; B60W 50/0097;
 (Continued)

(56) References Cited

U.S. PATENT DOCUMENTS

| 2016/0257294 A1* | 9/2016 | Morisaki ............... B60W 10/08 |
| 2017/0253239 A1 | 9/2017 | Satomura |

(Continued)

FOREIGN PATENT DOCUMENTS

| JP | 2014-151760 A | 8/2014 |
| JP | 2017-157131 A | 9/2017 |

(Continued)

OTHER PUBLICATIONS

Infiniti, 2015 Infiniti Q70 Hybrid Owner's Manual, 2015, Infiniti. pp. 2-29-2-31 (Year: 2015).*

*Primary Examiner* — Andrew R Dyer
*Assistant Examiner* — Chase L Cooley
(74) *Attorney, Agent, or Firm* — Sughrue Mion, PLLC (57) ABSTRACT

A travel support control device: creates a travel support plan in which one of travel modes including a CD mode and a CS mode is assigned to each travel section based on look-ahead information generated for a travel route to allow a hybrid electric vehicle to travel and calculates a total distance of electric traveling on the travel route; creates a travel support plan for travel sections to a travel section immediately before an information non-acquirable area in which information required for creating the look-ahead information is not acquirable and calculates the total distance of electric traveling on the travel route, when the information non-acquirable area is included in the travel route; and stops switching of the travel mode based on travel support control and continuously calculates the total distance of electric traveling on the travel route, when the hybrid electric vehicle is traveling in the information non-acquirable area.

8 Claims, 3 Drawing Sheets

(51) Int. Cl.
  *B60W 20/13* (2016.01)
  *B60W 30/182* (2020.01)
  *B60W 40/105* (2012.01)
  *B60W 50/00* (2006.01)
  *B60W 50/14* (2020.01)
  *G01C 21/34* (2006.01)

(52) U.S. Cl.
  CPC ........ *B60W 30/182* (2013.01); *B60W 40/105* (2013.01); *B60W 50/0097* (2013.01); *B60W 50/14* (2013.01); *G01C 21/3469* (2013.01); *B60L 2250/16* (2013.01); *B60L 2260/26* (2013.01); *B60L 2260/52* (2013.01); *B60L 2260/54* (2013.01); *B60W 2050/0083* (2013.01); *B60W 2050/146* (2013.01); *B60W 2510/244* (2013.01); *B60W 2540/106* (2013.01)

(58) Field of Classification Search
  CPC ......... B60W 50/14; B60W 2050/0083; B60W 2050/146; B60W 2510/244; B60W 2540/106; B60W 2510/305; B60W 2710/244; B60L 58/13; B60L 2250/16; B60L 2260/26; B60L 2260/52; B60L 2260/54; B60L 2240/622; G01C 21/3469; Y02T 10/62
  See application file for complete search history.

(56) References Cited

U.S. PATENT DOCUMENTS

| | | |
|---|---|---|
| 2019/0096260 A1* | 3/2019 | Ahn ................ G08G 1/096725 |
| 2020/0130670 A1 | 4/2020 | Ogawa |
| 2020/0145802 A1 | 5/2020 | Kawaguchi |

FOREIGN PATENT DOCUMENTS

| | | |
|---|---|---|
| JP | 2020-069896 A | 5/2020 |
| JP | 2020-072426 A | 5/2020 |

* cited by examiner

TRAVEL SUPPORT CONTROL DEVICE FOR HYBRID ELECTRIC VEHICLE

CROSS-REFERENCE TO RELATED APPLICATION

This application claims priority to Japanese Patent Application No. 2021-124299 filed on Jul. 29, 2021, incorporated herein by reference in its entirety.

BACKGROUND

1. Technical Field

The disclosure relates to a travel support control device for a hybrid electric vehicle and, more particularly, to a travel support control device for a hybrid electric vehicle that creates a travel support plan in which travel modes are assigned to a travel route to allow the hybrid electric vehicle to travel.

2. Description of Related Art

In the related art, a travel support control device that selects one of an electric-vehicle travel mode (an EV mode) and a hybrid-vehicle travel mode (an HV mode) for each of sections other than one or more sections immediately before a destination in a travel route from a current location to the destination was proposed as such a type of travel support control device for a hybrid electric vehicle (for example, see Japanese Unexamined Patent Application Publication No. 2014-151760 (JP 2014-151760 A)). With this device, the running cost of a hybrid electric vehicle as a whole can be additionally reduced through the aforementioned control.

SUMMARY

However, with the aforementioned hybrid electric vehicle, when a travel route from a current location to a destination crosses between countries, states, provinces, or the like and includes a country, a state, a province, or the like in which information required for creating a travel support plan cannot be acquired, it is not possible to create a travel support plan which is suitable as a whole and it is difficult to cope with such a case.

The disclosure provides a travel support control device for a hybrid electric vehicle that can cope with a case in which a travel route includes an area in which information required for creating a travel support plan is not able to be acquired by creating a more appropriate travel support plan.

A travel support control device for a hybrid electric vehicle according to the disclosure employs the following configurations.

A travel support control device for a hybrid electric vehicle according to the disclosure is a travel support control device for a hybrid electric vehicle including an engine, a motor, a battery, and a navigation system that performs route guidance for a travel route from a current location to a destination, the travel support control device performing travel support control in which a travel support plan in which one of travel modes including a CD mode and a CS mode is assigned to each travel section of the travel route based on look-ahead information generated for the travel route is created and the hybrid electric vehicle is allowed to travel according to the travel support plan and calculating a total distance of electric traveling on the travel route as one result of the travel support control, wherein the travel support control device is configured to create a travel support plan for travel sections from the current location to a travel section immediately before an information non-acquirable area in which information required for creating the look-ahead information is not acquirable and calculate the total distance of electric traveling on the travel route when the information non-acquirable area is included in the travel route from the current location to the destination, and to stop switching of the travel mode based on the travel support control and continuously calculate the total distance of electric traveling on the travel route when the hybrid electric vehicle is traveling in the information non-acquirable area.

The travel support control device for a hybrid electric vehicle according to the disclosure performs travel support control in which a travel support plan in which one of travel modes including a CD mode and a CS mode is assigned to each travel section of a travel route based on look-ahead information generated for the travel route is created and the hybrid electric vehicle is allowed to travel according to the travel support plan, and calculates a total distance of electric traveling on the travel route as one result of the travel support control. Then, the travel support control device creates a travel support plan for travel sections from the current location to a travel section immediately before an information non-acquirable area in which information required for creating the look-ahead information is not acquirable and calculates the total distance of electric traveling on the travel route when the information non-acquirable area is included in the travel route from the current location to the destination, and stops switching of the travel mode based on the travel support control and continuously calculates the total distance of electric traveling on the travel route when the hybrid electric vehicle is traveling in the information non-acquirable area. Accordingly, even when an area in which information required for creating a travel support plan is not acquirable is included in a travel route, it is possible to create a more appropriate travel support plan and to cope with such a case. An information acquirable area in which information required for creating look-ahead information is acquirable or the information non-acquirable area is often determined according to countries, states, provinces, or the like.

The travel support control device for a hybrid electric vehicle according to the disclosure may create a travel support plan for travel sections from a travel section outside of the information non-acquirable area to the destination when the current location is in the information non-acquirable area. With this configuration, it is possible to create a more appropriate travel support plan for travel sections from a travel section immediately after the information non-acquirable area to the destination.

The travel support control device for a hybrid electric vehicle according to the disclosure may not perform the travel support control until the hybrid electric vehicle is out of the information non-acquirable area when the current location is in the information non-acquirable area. With this configuration, it is possible to curb execution of unnecessary travel support control.

The travel support control device for a hybrid electric vehicle according to the disclosure may create a travel support plan for travel sections from the current location to a travel section immediately before the information non-acquirable area when the destination is in the information non-acquirable area. With this configuration, it is possible to create a more appropriate travel support plan for travel sections from the current location to a travel section immediately before the information non-acquirable area.

The travel support control device for a hybrid electric vehicle according to the disclosure may create a travel support plan for travel sections from a travel section outside of the information non-acquirable area to the destination when the hybrid electric vehicle travels from inside of the information non-acquirable area to outside of the information non-acquirable area. With this configuration, it is possible to create an appropriate travel support plan after the hybrid electric vehicle has returned from inside of the information non-acquirable area to outside of the information non-acquirable area.

The travel support control device for a hybrid electric vehicle according to the disclosure may stop switching of the travel mode based on the travel support control and continuously calculate the total distance of electric traveling on the travel route when the hybrid electric vehicle reaches the information non-acquirable area while the travel support control is being performed. With this configuration, it is possible to calculate the total distance of electric traveling on the whole travel route.

The travel support control device for a hybrid electric vehicle according to the disclosure may notify of the total distance of electric traveling on the travel route when the hybrid electric vehicle arrives at the destination. That is, the total distance of electric traveling on the travel route is notified of regardless of whether the destination is inside or outside of the information non-acquirable area. With this configuration, it is possible to notify a driver or the like of the total distance of electric traveling on the travel route as one result of the travel support control regardless of whether the hybrid electric vehicle is traveling in the information non-acquirable area and regardless of whether the destination is inside of the information non-acquirable area.

The travel support control device for a hybrid electric vehicle according to the disclosure may allow the hybrid electric vehicle to travel while switching between electric traveling and hybrid traveling based on an accelerator operation amount, a vehicle speed, or a state of charge of a battery when the hybrid electric vehicle is traveling in the information non-acquirable area. The hybrid electric vehicle may be allowed to travel in the CD mode in the information non-acquirable area until the state of charge of the battery reaches a threshold value and may be allowed to travel in the CS mode thereafter. Alternatively, the hybrid electric vehicle may be allowed to travel in the CS mode in the information non-acquirable area.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
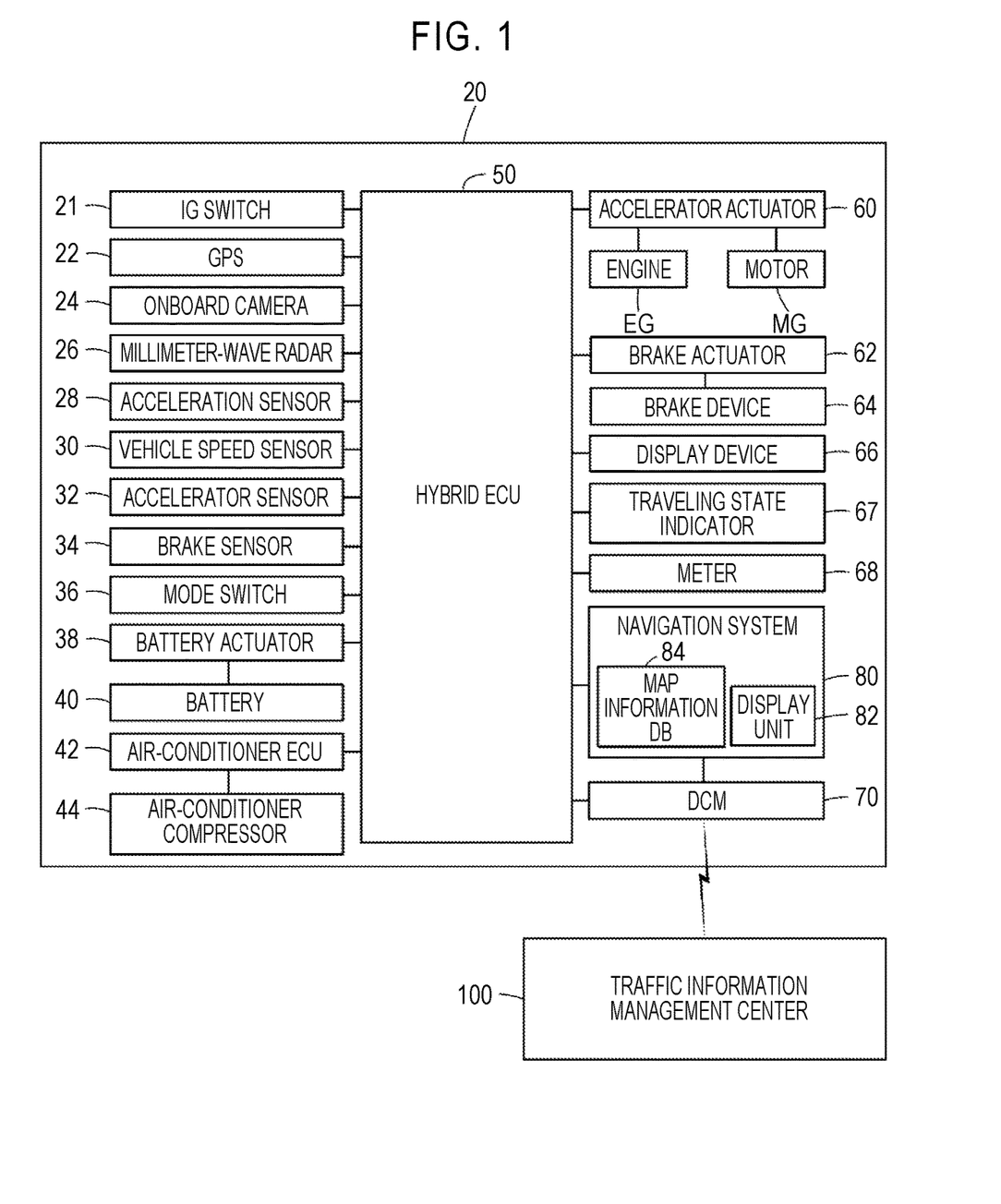
FIG. 1 is a block diagram illustrating an example of a configuration of a travel support control device for a hybrid electric vehicle 20 according to an embodiment of the disclosure with a hybrid ECU 50 as a central block.

Hereinafter, a mode for carrying out the disclosure will be described with reference to an embodiment. FIG. 1 is a block diagram illustrating an example of a configuration of a travel support control device for a hybrid electric vehicle 20 according to an embodiment of the disclosure with a hybrid electronic control unit (hereinafter referred to as a hybrid ECU) 50 as a central block. The electronic control unit 50 corresponds to the travel support control device. The hybrid electric vehicle 20 according to the embodiment includes an engine EG and a motor MG as power sources as illustrated in the drawing. The hybrid electric vehicle 20 according to the embodiment travels while switching a travel mode between a charge depleting mode (a CD mode) in which electric traveling has priority such that a state of charge SOC of a battery 40 decreases and a charge sustaining mode (a CS mode) in which electric traveling and hybrid traveling are used together such that the state of charge SOC of the battery 40 is maintained at a target value. Electric traveling is a mode in which the hybrid electric vehicle travels using only power from the motor MG in a state in which operating of the engine EG has been stopped, and hybrid traveling is a mode in which the engine EG operates and the hybrid electric vehicle travels using power from the engine EG and power from the motor MG.

The hybrid electric vehicle 20 according to the embodiment includes an ignition switch 21, a Global Positioning System (Global Positioning Satellite) (GPS) unit 22, an onboard camera 24, a millimeter-wave radar 26, an acceleration sensor 28, a vehicle speed sensor 30, an accelerator sensor 32, a brake sensor 34, a mode switch 36, a battery actuator 38, a battery 40, an air-conditioner electronic control unit (hereinafter referred to as an air-conditioner ECU) 42, an air-conditioner compressor 44, a hybrid ECU 50, an accelerator actuator 60, a brake actuator 62, a brake device 64, a display device 66, a traveling state indicator 67, a meter 68, a data communication module (DCM) 70, and a navigation system 80 in addition to the power sources.

The GPS unit 22 is a device that detects a position of a vehicle based on signals transmitted from a plurality of GPS satellites. The onboard camera 24 is a camera that images surroundings of the vehicle and corresponds to, for example, a front-view camera that images a front view of the vehicle or a rear-view camera that images a rear view of the vehicle. The millimeter-wave radar 26 detects an inter-vehicle distance or a relative speed between the host vehicle and a front vehicle or detects an inter-vehicle distance or a relative speed between the host vehicle and a rear vehicle.

The acceleration sensor 28 is, for example, a sensor that detects an acceleration in a longitudinal direction of the vehicle or detects an acceleration in a right-left direction (a lateral direction) of the vehicle. The vehicle speed sensor 30 detects a vehicle speed of the vehicle based on wheel speeds or the like. The accelerator sensor 32 detects an accelerator operation amount or the like corresponding to an amount of depression of an accelerator pedal by a driver. The brake sensor 34 detects a brake position or the like which is an amount of depression of a brake pedal by the driver. The mode switch 36 is a switch that is provided in the vicinity of a steering wheel in a driver's seat and switches between a CD mode and a CS mode.

The battery actuator 38 detects conditions such as an inter-terminal voltage, a charging/discharging current, and a battery temperature of the battery 40 and manages the battery 40 based on the results of detection. The battery actuator 38 calculates a state of charge SOC which is a ratio of a residual storage capacity to a full storage capacity based on the charging/discharging current or calculates an allowable maximum output electric power (an output limit Wout) which may be output from the battery 40 or an allowable maximum input electric power (an input limit Win) which may be input to the battery 40 based on the state of charge SOC, the battery temperature, and the like. The battery 40 is configured as a rechargeable secondary battery and, for example, a lithium ion battery, a nickel-hydride battery, or a lead storage battery can be used.

The air-conditioner ECU 42 is configured as a microcomputer that is not illustrated but includes a CPU as a major constituent, and includes a ROM, a RAM, a flash memory, an input port, an output port, and a communication port in addition to the CPU. The air-conditioner ECU 42 is assembled into an air conditioner that conditions air of a cabin and controls driving of the air-conditioner compressor 44 in the air conditioner such that the temperature of the cabin reaches a set temperature.

The engine EG is configured as, for example, an internal combustion engine. The motor MG is configured as, for example, an electric motor that also serves as a power generator such as a synchronous generator motor. The motor MG is connected to the battery 40 via an inverter which is not illustrated and can output a driving force using electric power supplied from the battery 40 or charge the battery 40 with electric power generated therein.

The hybrid ECU 50 is configured as a microcomputer that is not illustrated but includes a CPU as a major constituent, and includes a ROM, a RAM, a flash memory, an input port, an output port, and a communication port in addition to the CPU. The hybrid ECU 50 sets a travel mode or sets a target operating point (a target rotation speed or a target torque) of the engine EG or a torque command for the motor MG based on the set travel mode, the accelerator operation amount from the accelerator sensor 32, the brake position from the brake sensor 34, and the output limit and the input limit from the battery actuator 38. The hybrid ECU 50 is not started in an accessory-on state but is started in a ready-on state.

In electric traveling, the hybrid ECU 50 sets a required driving force or a required power based on the accelerator operation amount from the accelerator sensor 32 or the vehicle speed from the vehicle speed sensor 30, sets a torque command for the motor MG such that the required driving force or the required power is output to the vehicle, and transmits the set torque command to the accelerator actuator 60. In hybrid traveling, the hybrid ECU 50 sets a target operating point for the engine EG and a torque command for the motor MG such that the required driving force or the required power is output to the vehicle, and transmits the target operating point and the torque command to the accelerator actuator 60. When the brake pedal is depressed, the hybrid ECU 50 sets a required braking force based on the brake position from the brake sensor 34 or the vehicle speed from the vehicle speed sensor 30, sets a regenerative torque command for controlling regeneration of the motor MG based on the required braking force or the vehicle speed, sets a target braking force from a brake device, transmits the torque command to the accelerator actuator 60, and transmits the target braking force to the brake actuator 62.

The accelerator actuator 60 controls driving of the engine EG or the motor MG based on the target operating point or the torque command set by the hybrid ECU 50. The accelerator actuator 60 performs intake air amount control, fuel injection control, ignition control, intake valve opening/closing timing control, and the like such that the engine EG operates at the target operating point (a target rotation speed or a target torque). The accelerator actuator 60 controls switching of switching elements of the inverter for driving the motor MG such that a torque corresponding to the torque command is output from the motor MG.

The brake actuator 62 controls the brake device 64 such that the target braking force set by the hybrid ECU 50 is applied to the vehicle by the brake device 64. The brake device 64 is configured as, for example, a hydraulic frictional brake.

The display device 66 is assembled into, for example, an instrument panel in front of a driver's seat and displays various types of information. The traveling state indicator 67 includes an EV indicator and an HV indicator which are not illustrated, turns on the EV indicator and turns off the HV indicator in electric traveling, and turns off the EV indicator and turns on the HV indicator in hybrid traveling. The meter 68 is assembled into, for example, the instrument panel in front of the driver's seat.

The DCM 70 transmits information of the host vehicle to a traffic information management center 100 or receives road traffic information from the traffic information management center 100. Examples of the information of the host vehicle include a position, a vehicle speed, a traveling power, and a travel mode of the host vehicle. Examples of the road traffic information include information on current or future congestion, information on a predicted value of a current average vehicle speed or a future average vehicle speed in sections of a travel route, information on traffic regulations, information on weather, information on road surface conditions, and information on maps. The DCM 70 communicates with the traffic information management center 100 at intervals of a predetermined time (for example, at intervals of 30 seconds, 1 minute, or 2 minutes).

The navigation system 80 is a system that guides the host vehicle to a set destination and includes a display unit 82 and a map information database 84. The navigation system 80 communicates with the traffic information management center 100 via the DCM 70. When a destination is set, the navigation system 80 sets a route based on information of the destination, information of a current location (a current position of the host vehicle) acquired by the GPS unit 22, and map information stored in the map information database 84. The navigation system 80 acquires road traffic information by communicating with the traffic information management center 100 at intervals of a predetermined time (for example, at intervals of 3 minutes or 5 minutes), and performs route guidance based on the road traffic information.

In the route guidance, whenever road traffic information is acquired from the traffic information management center 100 (or at intervals of a predetermined time), the navigation system 80 generates load information and the like required for traveling in each travel section as look-ahead information based on information of each travel section or information of a travel load in the travel route out of the road traffic information acquired from the traffic information management center 100, the vehicle speed of the host vehicle, a travel power of the host vehicle, a travel mode of the host vehicle, and the like and transmits the generated look-ahead information to the hybrid ECU 50. The look-ahead information includes information of the host vehicle such as a position, a vehicle speed, a travel power, and a travel mode of the host vehicle, information on current or future congestion, information on a predicted value of a current average vehicle speed or a future average vehicle speed in sections of the travel route, information on traffic regulations, information on weather, information on road surface conditions, and information on maps.

Figure 2:
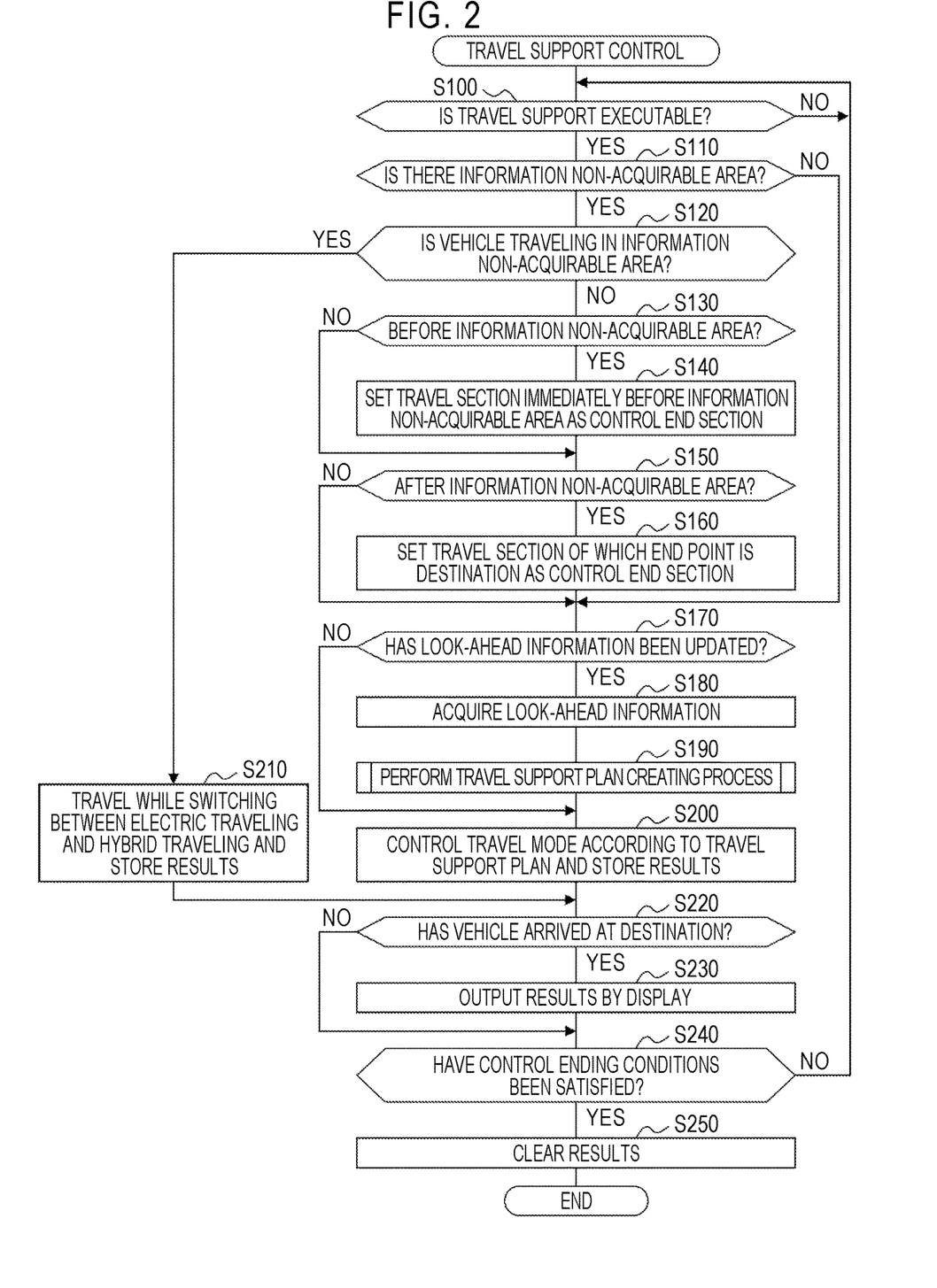
FIG. 2 is a flowchart illustrating an example of travel support control which is performed by the hybrid ECU 50.

Operations of the hybrid electric vehicle 20 having the aforementioned configuration will be described below. FIG. 2 is a flowchart illustrating an example of travel support control which is performed by the hybrid ECU 50. This flowchart is performed after the ignition switch 21 has been turned on.

In the travel support control, first, it is determined whether travel support control is executable (Step S100). Since the travel support control is control in which one of the CD mode and the CS mode is assigned as a travel mode of each section of a route and the host vehicle is allowed to travel when a route from a current location to a destination is set by the navigation system 80 as described above, the travel support control is not executable when a destination is not set. The travel support control is not executable when route guidance cannot be performed well such as when an abnormality occurs in the navigation system 80 or when an abnormality occurs in the GPS unit 22. When the battery temperature is low, the output limit Wout which is an allowable maximum output electric power which may be output from the battery 40 decreases, the engine EG may be frequently started even when the host vehicle is traveling in the CD mode, and the host vehicle may not be able to travel appropriately in the CD mode. In Step S100, it is determined whether travel support control is executable due to such circumstances. When it is determined in Step S100 that travel support control is not executable, this routine waits until travel support control becomes executable.

Figure 3:
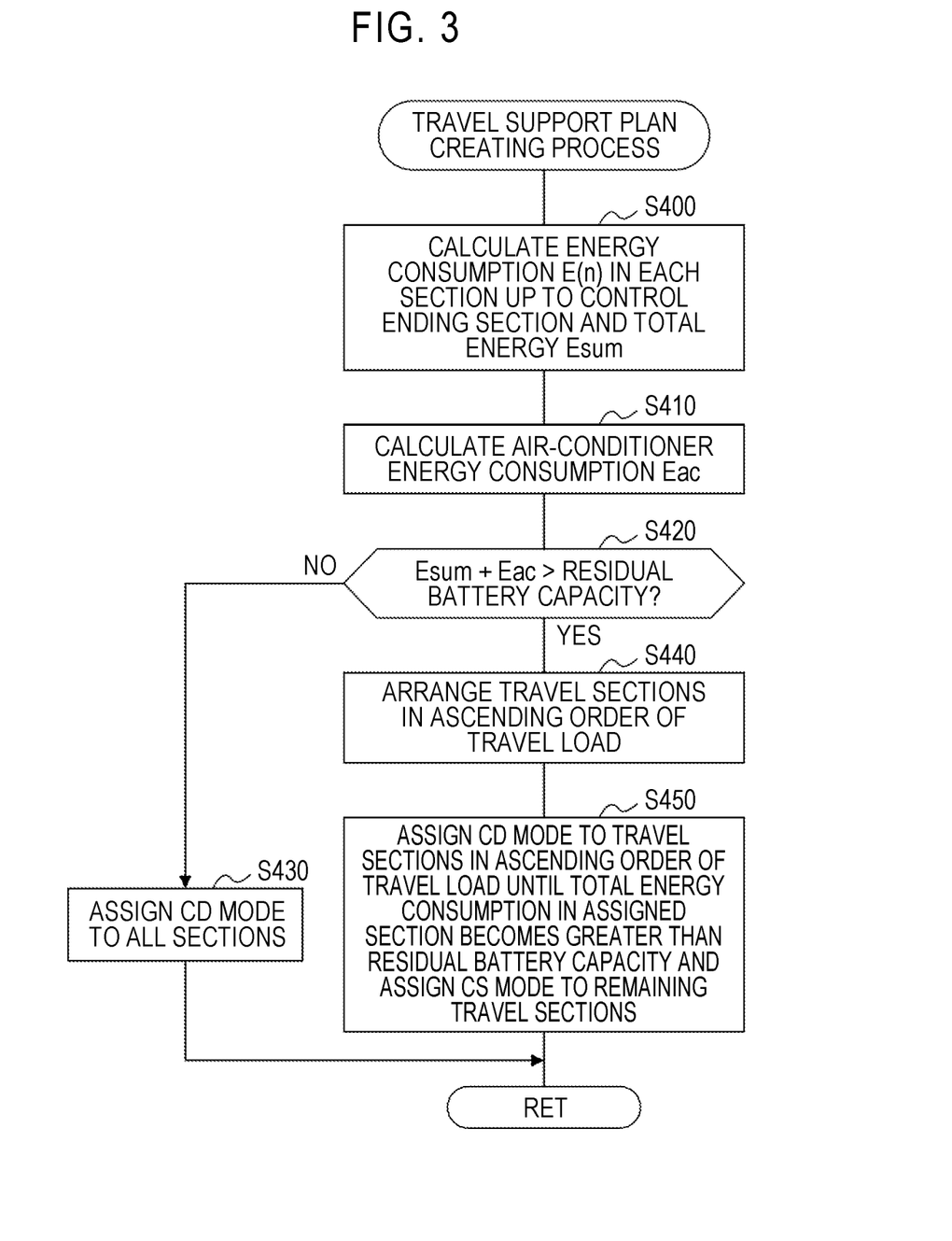
FIG. 3 is a flowchart illustrating an example of travel support plan creating process which is performed by the hybrid ECU 50.

When it is determined in Step S100 that travel support control is executable, it is determined whether an information non-acquirable area in which information required for generating look-ahead information is not acquirable is included in a travel route from a current location to a destination (Step S110). The information non-acquirable area can be determined, for example, by countries, states, provinces, or the like. When it is determined that no information non-acquirable area is included in the travel route, it is determined whether look-ahead information transmitted from the navigation system 80 has been updated (Step S170). When the process of Step S170 is performed for the first time after travel support control has been performed, the look-ahead information has not been updated but updating of the look-ahead information is considered to be performed according to necessity for creating a travel support plan. When it is determined that look-ahead information has been updated, the look-ahead information is acquired (Step S180) and a travel support plan creating process is performed to create a travel support plan (Step S190). FIG. 3 illustrates an example of the travel support plan creating process.

In the travel support plan creating process illustrated in FIG. 3, first, energy consumption E(n) in each travel section of the travel route from the current location to a control ending section (the destination) and total energy Esum which is a sum thereof are calculated (Step S400). The energy consumption E(n) in each travel section can be determined based on criteria such as whether the travel section is an urban section, a suburban section, or a mountainous section. Then, air-conditioner energy consumption Eac is calculated (Step S410). In this embodiment, the air-conditioner energy consumption Eac is calculated by multiplying power consumption of an air conditioner at that time, predetermined power consumption, maximum power consumption of the air conditioner, or the like by a predetermined time (a time required for traveling 10 km or 15 km). Then, it is determined whether the sum of the total energy Esum and the air-conditioner energy consumption Eac is greater than a residual capacity of the battery 40 (Step S420). The residual capacity of the battery 40 can be calculated by multiplying the full capacity of the battery 40 by the state of charge SOC. When it is determined that the sum of the total energy Esum and the air-conditioner energy consumption Eac is equal to or less than the residual capacity of the battery 40, the CD mode is assigned to all travel sections (Step S430). When it is determined that the sum of the total energy Esum and the air-conditioner energy consumption Eac is greater than the residual capacity of the battery 40, the travel sections are arranged in the ascending order of a travel load (an average load in the sections) (Step S440), and the CD mode is assigned to the travel sections until the sum of the energy consumption En in the travel sections assigned in the ascending order of the travel load becomes greater than the residual capacity of the battery 40 and the CS mode is assigned to the remaining travel sections (Step S450). That is, the CD mode and the CS mode are assigned to the travel route based on the premise that the sum of the total energy Esum and the air-conditioner energy consumption Eac is greater than the residual capacity of the battery 40.

Description will be made back to the travel support control illustrated in FIG. 2 below. When the travel support plan is created in this way, the travel mode is controlled based on the travel support plan and results of the travel support control (control results) are accumulated (Step S200). Examples of the control results include a traveling distance or a traveling time by electric traveling and a traveling distance or a traveling time by hybrid traveling in the travel support control. The accumulated control results are stored in a flash memory or the like which is not illustrated in the hybrid ECU 50.

Subsequently, it is determined whether the host vehicle has arrived at the destination (Step S220), and the control results are output as a display when it is determined that the host vehicle has arrived at the destination (Step S230). For example, the display output of the control results is performed by displaying "electric traveling XX km, hybrid traveling YY km" on the display device 66 assembled into the instrument panel in front of the driver's seat.

When it is determined in Step S220 that the host vehicle has not arrived at the destination or after control results have been output as a display as a result of determination that the host vehicle has arrived at the destination, it is determined whether travel support control ending conditions have been satisfied (Step S240). Examples of the travel support control ending conditions include a condition that the host vehicle has arrived at the destination, a condition that the residual capacity of the battery 40 has changed due to charging or the like, and a condition that an operation of ending the travel support control has been performed by a driver or the like. When it is determined that the travel support control ending conditions have not been satisfied, the routine returns to the process of determining whether the travel support control is executable in Step S100. When it is determined that the travel support control ending conditions have been satisfied, the control results are cleared (Step S250), and the travel support control ends. When the residual capacity of the battery 40 has changed due to charging or the like, the travel support control ends. When new travel support control is started, this routine is performed again.

When it is determined in Step S110 that an information non-acquirable area is included in the travel route, it is determined whether the host vehicle is traveling in the information non-acquirable area (Step S120). When it is determined that the host vehicle is not traveling in the information non-acquirable area, it is determined whether the host vehicle is traveling before the information non-acquirable area (Step S130) or it is determined whether the host vehicle is traveling after the information non-acquirable area (Step S150). When it is determined that the host vehicle is traveling before the information non-acquirable area, a travel section immediately before the information non-acquirable area is set as a control end section (Step S140), and the processes of Steps S170 to S200 and the processes of S220 to S250 are performed. On the other hand, when it is determined that the host vehicle is traveling after the information non-acquirable area, a travel section with the destination as an end point is set as the control end section (Step S160), and the processes of Steps S170 to S200 and the processes of Steps S220 to S250 are performed.

When it is determined in Step S210 that the host vehicle is traveling in the information non-acquirable area, the host vehicle travels while switching between the electric traveling and the hybrid traveling based on the acceleration operation amount, the vehicle speed, or the state of charge SOC of the battery 40, the results of travel support control (control results) are accumulated (Step S210), and the processes of Step S220 and steps subsequent thereto are performed.

Now, it is assumed that the current location is outside of the information non-acquirable area and the destination is in the information non-acquirable area. In this case, a travel support plan for travel sections from the current location to a travel section immediately before the information non-acquirable area is created, the host vehicle is allowed to travel while switching the travel mode based on the created travel support plan, and the results of travel support control (such as a total distance in electric traveling or a total distance in hybrid traveling) are calculated and stored. When the host vehicle reaches inside of the information non-acquirable area, the host vehicle is allowed to travel to the destination while switching between electric traveling and hybrid traveling based on the accelerator operation amount, the vehicle speed, and the state of charge SOC of the battery 40, and the results of travel support control are continuously calculated and stored. When the host vehicle arrives at the destination, the results of travel support control are output, for example, by displaying "electric traveling XX km, hybrid traveling YY km" on the display device 66.

It is assumed that the current location is in the information non-acquirable area and the destination is outside of the information non-acquirable area. In this case, when the host vehicle is traveling from the current location to an area outside of the information non-acquirable area, the host vehicle is allowed to travel while switching between electric traveling and hybrid traveling based on the acceleration operation amount, the vehicle speed, and the state of charge SOC of the battery 40, and the results of travel support control (such as a total distance in electric traveling or a total distance in hybrid traveling) are calculated and stored. When the host vehicle reaches the outside of the information non-acquirable area, a travel support plan for travel sections from the position at which the host vehicle is out of the information non-acquirable area to the destination is created, the host vehicle is allowed to travel while switching the travel mode based on the created travel support plan, and the results of travel support control are continuously calculated and stored. When the host vehicle arrives at the destination, the results of travel support control are output, for example, by displaying "electric traveling XX km, hybrid traveling YY km" on the display device 66.

It is assumed that an information non-acquirable area is present in the way from the current location to the destination. In this case, since the current location is outside of the information non-acquirable area, a travel support plan for travel sections from the current location to a travel section immediately before the information non-acquirable area is created, the travel mode is switched based on the created travel support plan, and the results of travel support control (such as a total distance in electric traveling or a total distance in hybrid traveling) are calculated and stored. When the host vehicle reaches inside of the information non-acquirable area, the host vehicle is allowed to travel while switching between electric traveling and hybrid traveling based on the acceleration operation amount, the vehicle speed, and the state of charge SOC of the battery 40, and the results of travel support control are continuously calculated and stored. When the host vehicle reaches the outside of the information non-acquirable area, a travel support plan for travel sections from the position at which the host vehicle is out of the information non-acquirable area to the destination is created, the host vehicle is allowed to travel while switching the travel mode based on the created travel support plan, and the results of travel support control are continuously calculated and stored. When the host vehicle arrives at the destination, the results of travel support control are output, for example, by displaying "electric traveling XX km, hybrid traveling YY km" on the display device 66.

With the travel support control device for a hybrid electric vehicle 20 according to the aforementioned embodiment, when the current location is outside of the information non-acquirable area and the destination is in the information non-acquirable area, first, a travel support plan for travel sections from the current location to a travel section immediately before the information non-acquirable area is created, the host vehicle travels while switching the travel mode based on the created travel support plan, and the results of travel support control (such as a total distance in electric traveling or a total distance in hybrid traveling) are calculated and stored. Subsequently, when the host vehicle reaches inside of the information non-acquirable area, the host vehicle is allowed to travel to the destination while switching between electric traveling and hybrid traveling based on the acceleration operation amount, the vehicle speed, and the state of charge SOC of the battery 40, and the results of travel support control are continuously calculated and stored. When the host vehicle arrives at the destination, the results of travel support control are output by displaying the results of travel support control on the display device 66. Accordingly, it is possible to create a more appropriate travel support plan for travel sections from the current location to a travel section immediately before the information non-acquirable area.

With the travel support control device for a hybrid electric vehicle 20 according to the embodiment, when the current location is in the information non-acquirable area and the destination is outside of the information non-acquirable area, first, the host vehicle is allowed to travel while switching between electric traveling and hybrid traveling based on the accelerator operation amount, the vehicle speed, or the state of charge SOC of the battery 40 in an area from the current location to a position outside of the information non-acquirable area, and the results of travel support control (such as a total distance in electric traveling or a total distance in hybrid traveling) are calculated and stored. Subsequently, when the host vehicle reaches outside of the information non-acquirable area, a travel support plan for travel sections from the position at which the host vehicle is out of the information non-acquirable area to the destination is created, the host vehicle is allowed to travel while switching the travel mode based on the created travel support plan, and the results of travel support control are continuously calculated and stored. When the host vehicle arrives at the destination, the results of travel support control are output by displaying the results of travel support control on the display device 66. Accordingly, it is possible to create a more appropriate travel support plan for travel sections from the position at which the host vehicle is out of the information non-acquirable area to the destination.

With the travel support control device for a hybrid electric vehicle 20 according to the embodiment, when an information non-acquirable area is present in the way from the current location to the destination, first, a travel support plan for travel sections from the current location to a travel section immediately before the information non-acquirable area is created, the travel mode is switched based on the created travel support plan, and the results of travel support control (such as a total distance in electric traveling or a total distance in hybrid traveling) are calculated and stored. Subsequently, when the host vehicle is traveling the information non-acquirable area, the host vehicle is allowed to travel while switching between electric traveling and hybrid traveling based on the acceleration operation amount, the vehicle speed, and the state of charge SOC of the battery 40, and the results of travel support control are continuously calculated and stored. Then, when the host vehicle reaches outside of the information non-acquirable area, a travel support plan for travel sections from the position at which the host vehicle is out of the information non-acquirable area to the destination is created, the host vehicle is allowed to travel while switching the travel mode based on the created travel support plan, and the results of travel support control are continuously calculated and stored. When the host vehicle arrives at the destination, the results of travel support control are output by displaying the results of travel support control on the display device 66. Accordingly, it is possible to create a more appropriate travel support plan for travel sections in an area other than the information non-acquirable area in the travel route from the current location to the destination.

With the travel support control device for a hybrid electric vehicle 20 according to the embodiment, even when an area in which information required for creating a travel support plan is not acquirable is included in a travel route as described above, it is possible to create a more appropriate travel support plan and to cope with that case.

With the travel support control device for a hybrid electric vehicle 20 according to the embodiment, when the host vehicle is traveling in an information non-acquirable area, the host vehicle is allowed to travel while switching between electric traveling and hybrid traveling based on the acceleration operation amount, the vehicle speed, and the state of charge SOC of the battery 40. However, when the host vehicle is traveling in an information non-acquirable area, the host vehicle may be allowed to travel in the CD mode until the state of charge SOC of the battery 40 reaches a threshold value and to travel in the CS mode thereafter, or may be allowed to travel continuously in the CS mode.

With the travel support control device for a hybrid electric vehicle 20 according to the embodiment, a case in which there is only one information non-acquirable area such as a case in which a current location is in an information non-acquirable area, a case in which a destination is in an information non-acquirable area, or a case in which an information non-acquirable area is present in the travel route from the current location to the destination can be coped with. However, the same is true when there are two or more information non-acquirable areas.

With the travel support control device for a hybrid electric vehicle 20 according to the embodiment, when a current location is in an information non-acquirable area, the host vehicle is allowed to travel while switching between electric traveling and hybrid traveling based on the acceleration operation amount, the vehicle speed, and the state of charge SOC of the battery 40 in an area from the current location to a position at which the host vehicle is out of the information non-acquirable area, and results of travel support control are calculated and stored. However, when the current location is in the information non-acquirable area, travel support control may not be performed until the host vehicle is out of the information non-acquirable area. In this case, it is also preferable that the results of travel support control be calculated and stored.

In the hybrid electric vehicle 20 according to the embodiment, the navigation system 80 sets a travel route from a current location to a destination using the map information database 84 based on information of the current location and information of the destination, but may set the travel route from the current location to the destination in cooperation with the traffic information management center 100. That is, the navigation system 80 may set a travel route by transmitting information of a current location and information of a destination to the traffic information management center 100 and receiving the travel route set based on the information of the current location and the information of the destination by the traffic information management center 100 from the traffic information management center 100.

Correspondence between principal elements in the embodiment and principal elements of the disclosure described in the SUMMARY will be described below. In the embodiment, the engine EG corresponds to an "engine," the motor MG corresponds to a "motor," the battery 40 corresponds to a "battery," and the hybrid ECU 50 corresponds to a "travel support control device."

Since the embodiment is an example for specifically describing the mode for carrying out the disclosure described in the SUMMARY, the correspondence between principal elements in the embodiment and principal elements of the disclosure described in the SUMMARY does not limit elements of the disclosure described in the SUMMARY That is, the disclosure described in the SUMMARY should be construed based on description in the SUMMARY, and the embodiment is only a specific example of the disclosure described in the SUMMARY.

While the mode for carrying out the disclosure has been described above with reference to the embodiment, the disclosure is not limited to the embodiment and can be modified in various forms without departing from the gist of the disclosure.

The disclosure is applicable to industry for manufacturing travel support control devices for a hybrid electric vehicle.

What is claimed is:

1. A travel support control device for a hybrid electric vehicle including an engine, a motor, a battery, and a navigation system that performs route guidance for a travel route from a current location to a destination, the travel support control device comprising one or more processors configured to:
   create a travel support plan in which one of a plurality of travel modes is assigned to each travel section of the travel route based on look-ahead information generated for the travel route,
   the plurality of travel modes including a charge depleting (CD) mode and a charge sustaining (CS) mode,
   the CD mode being a travel mode in which electric traveling has priority such that a state of charge of the battery decreases, the CS mode being a travel mode in which the electric traveling and hybrid traveling are used together such that the state of charge of the battery is maintained at a target value, the travel support plan being created, when the travel route from the current location to the destination includes an information non-acquirable area in which information required for creating the look-ahead information is not acquirable, for travel sections from the current location to a travel section immediately before the information non-acquirable area;

perform a travel support control such that the hybrid electric vehicle is allowed to travel according to the travel support plan;

calculate a total distance of the electric traveling on the travel route as one result of the travel support control;

determine whether the current location of the hybrid electric vehicle is in the information non-acquirable area or outside of the information non-acquirable area; and when the processors determine that the current location of the hybrid electric vehicle is traveling in the information non-acquirable area, (i) stop switching of the travel mode based on the travel support control and (ii) continuously calculate the total distance of electric traveling on the travel route.

2. The travel support control device according to claim 1, wherein the processors are configured to create, when the processors determine that the current location of the hybrid electric vehicle is in the information non-acquirable area, the travel support plan for travel sections from a travel section outside of the information non-acquirable area to the destination.

3. The travel support control device according to claim 1, wherein the processors are configured not to perform, when the processors determine that the current location of the hybrid electric vehicle is in the information non-acquirable area, the travel support control until the processors determine that the current location of the hybrid electric vehicle is outside of the information non-acquirable area.

4. The travel support control device according to claim 1, wherein the processors are configured to create the travel support plan for the travel sections from the current location to the travel section immediately before the information non-acquirable area when the destination is in the information non-acquirable area.

5. The travel support control device according to claim 1, wherein the processors are configured to create the travel support plan for travel sections from a travel section outside of the information non-acquirable area to the destination when the hybrid electric vehicle travels from inside of the information non-acquirable area to outside of the information non-acquirable area.

6. The travel support control device according to claim 1, wherein: the hybrid electric vehicle includes a display device; and the processors are configured to control the display device to notify of the total distance of electric traveling on the travel route when the hybrid electric vehicle arrives at the destination.

7. The travel support control device according to claim 1, wherein the processors are configured to allow the hybrid electric vehicle to travel while switching between electric traveling and hybrid traveling based on an accelerator operation amount, a vehicle speed, or a state of charge of the battery when the processors determine that the current location of the hybrid electric vehicle is traveling in the information non-acquirable area.

8. The travel support control device according to claim 1, wherein the processors are configured to calculate a total distance of the hybrid traveling as the result of the travel support control in addition to the total distance of the electric traveling.

\* \* \* \* \*